Dec. 31, 1940.   J. G. PROSSER   2,227,153
REINFORCEMENT FOR CONCRETE PIPE AND CENTRIFUGAL MOLD FOR THE SAME
Filed Feb. 8, 1937
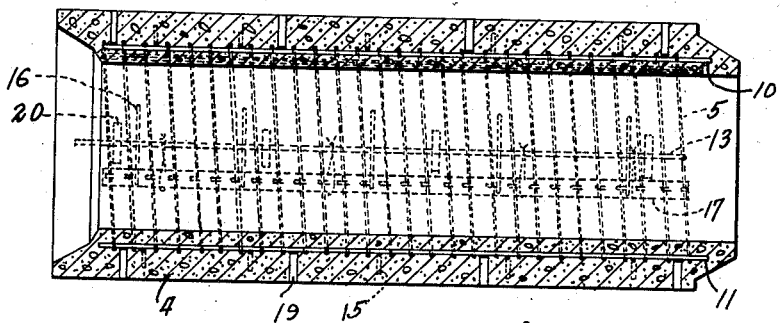
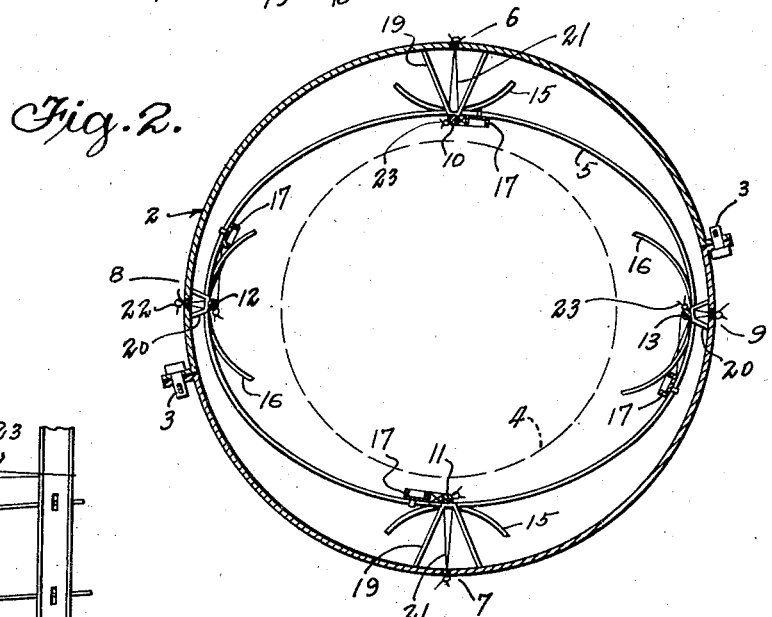
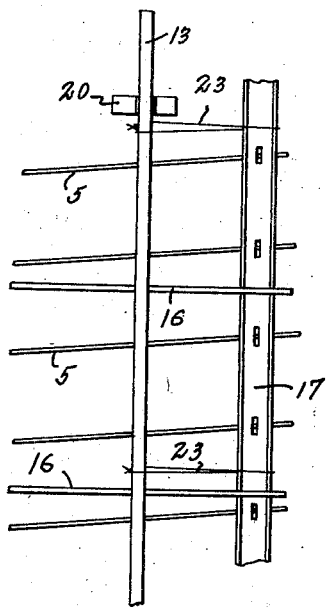
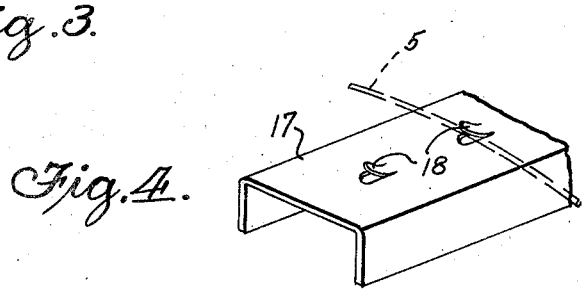
INVENTOR.
Joseph G. Prosser
BY Lyon & Lyon
ATTORNEYS Patented Dec. 31, 1940

2,227,153

UNITED STATES PATENT OFFICE 2,227,153

REINFORCEMENT FOR CONCRETE PIPE AND CENTRIFUGAL MOLD FOR THE SAME

Joseph G. Prosser, Onekama, Mich.

Application February 8, 1937, Serial No. 124,646

5 Claims. (Cl. 138—84)

This invention relates to a mold for producing concrete pipe by the centrifugal process and to the manner of securing reinforcements to the mold.

When a concrete pipe is to bear a load, such, for example, as an earth load when buried in the ground, it is desirable to reinforce such concrete pipe with an elliptical shaped reinforcing in order to secure advantage of the leverage of this reinforcement. The weak points of a concrete pipe under a vertical exterior load are the top and bottom. These points are usually the first to show a break. The next weakest points in the pipe are the two sides. The reinforcement for concrete pipe is usually in the form of a coil of wire held in elliptical shape. Considerable difficulty is encountered in holding the different turns in a wire in alignment.

It is the major object of the present invention to provide a reinforced concrete pipe or reinforcement therefor, which is economical in manufacture and which may be used to adequately align successively turns of a coil of reinforcement wire while avoiding the formation of weak points in the pipe.

In accordance with the present invention, I include in the reinforcement stiff longitudinal rods, preferably in each of the naturally weak points of the pipe, such as the top, bottom and two sides. The use of stiff reinforcing longitudinals in the construction of concrete pipe is generally regarded as forming a line of cleavage in the pipe, and, therefore, objectionable at the weak sections of the pipe. However, I have found that such longitudinal rods may with advantage be incorporated in the reinforcement at the weak points of the pipe if there is combined with such longitudinals a series of short reinforcing members, such as wire, which reinforcing members may have their ends turned back into the center of the concrete of the pipe. The added area of these reinforcing members permits them to act as anchors, affording sufficiently additional strength to adequately offset any tendency of the longitudinals to form weak lines of cleavage in the pipe. The reinforcement consisting of the elliptical coils of wire with its longitudinals disposed at the weak points of the pipe may be held in place by various means, but I prefer the construction of chairs attached to the wires or longitudinals to bear against the inner side of the mold to form the pipe. The resulting reinforcement of the pipe consisting of the wires, longitudinals, reinforcing members or anchors and chairs constitutes a readily and economically constructed reinforcement, rigid and easy to handle, and resulting in the formation of a concrete pipe of exceptional strength.

The present invention, together with various further objects and advantages thereof, will best be understood from a description of a preferred form of reinforced pipe or reinforcement therefor embodying the present invention. For this purpose, I hereinafter describe, with reference to the accompanying drawing, such preferred form or example.

In the drawing:

Figure 1 is a longitudinal section through the finished concrete pipe.

Figure 2 is an enlarged section at right angles to Figure 1 of the reinforcement and its attachment to a mold for forming the concrete pipe.

Figure 3 is a detail of the longitudinal and its connection with the various members.

Figure 4 is a fragmentary perspective of certain spacing rods.

Referring to the drawing, 2 indicates a cylindrical mold in which the pipe may be formed, the mold being indicated as split and held together by suitable devices 3. Any usual or preferred form of mold may be used, and the pipe may, if desired, be formed with the mold and by the method and apparatus shown in my copending application, "Method and apparatus for molding products," Serial No. 117,733, filed December 28, 1936, Patent No. 2,164,624, dated July 4, 1939.

To reinforce the concrete 4 of the pipe formed within the mold 2 there is employed a coil of reinforcing wire 5. This coil of reinforcing wire may be of any usual or desired kind, and the invention is applicable to coils having a reverse winding when desired. The coil of reinforcing wire is preferably supported within the mold in an elliptical shape, as illustrated, so as to have its shortest axis in the direction of the top 6 and bottom 7 of the pipe, whereby to better strengthen the finished pipe for the support of vertical loads. The use of such a coil of elliptical wire within the concrete pipe necessarily brings the coil of wire close to the inside of the concrete at the top and bottom points 6 and 7 and close to the outside of the concrete at the side points 8 and 9. Considerable difficulty is experienced in holding the successive turns of the coils of wire 5 in alignment in such an elliptical shape, and unless maintained in alignment there is considerable danger of creating a weak support at one of the four points 6, 7, 8 or 9. In order to properly align the successive turns of the coil 5, I prefer to employ at each of the points 6, 7, 8 and 9 a stiff longitudinal member, such as the members 10, 11, 12 and 13. These longitudinal members are spot-welded or wired when necessary to the turns of the coil of wire. The use of such longitudinal wires in the reinforcement of the pipe presents the danger that unless a perfect bond exists between the concrete and the longitudinal member there will be created a line of cleavage along such longitudinal members. In part, this may be overcome through the use of twisted rods for the longitudinal members in order to avoid the smooth surface of a round rod.

I have found that the formation of such cleavage lines or the existence of weakness in the pipe at the weak points thereof occasioned by the reinforcing or the longitudinal rods may be fully compensated for or over-compensated for by the attachment to the reinforcement at such weak points of anchors 15 or 16. These anchors 15 or 16 may be formed of various materials, but I find it sufficient to use short pieces of wire which are held to the reinforcement by being spot-welded either to the rods 10 to 13 or they may at times be merely wired in place. In any case, such anchor members have extending ends towards the direction of the pipe where the concrete is of the greater unbroken thickness. Thus, I have shown at the top and bottom points 6 and 7 the reinforcing anchors or wires 15 have their ends turned towards the outer diameter of the pipe to be formed, whereas at the sides 8 and 9 the reinforcing wires or anchors 16 have their ends turned inwardly towards the inner diameter of the pipe. However, the anchor members 15 and 16 may be extended in the same plane as the coil of wire 5, as they will thus reach places of concrete of greater thickness; the important thing being that they cross and are held in place during the forming of the pipe. A sufficient area of steel should be provided in these reinforcing wires or anchors as to fully compensate for any loss of strength in the pipe caused by the longitudinal rods, and, in fact, when desired, by the use of sufficient of such anchors 15 or 16 the strength of the pipe at the four normally weak points may be made as strong or even stronger than the remainder of the pipe.

To further insure the coils of the reinforcement 5 remaining in alignment, spacing rods 17, preferably of channel shape, may be employed of any usual or desired design, having punched out tongues 18 for engaging the successive coils of wire. The tongues 18 are closed over the turns of the wire, and the spacing rods 17 then moved near the longitudinal rods 10 to 13. The spacing rods 17 and the longitudinal rods 10 to 13 are then preferably wired together, as indicated at 23, at selected points where the coil is out of true. This obviates the necessity of welding or otherwise attaching every individual turn of wire in the coil 5 to the longitudinal rods 10 to 13, inclusive. In order to maintain the elliptical shape of the reinforcement and for properly mounting and supporting the same within the mold various means may be employed, but I prefer the use of so-called chairs 19 or 20, which consist simply of strips or rods or wires welded or otherwise attached to the reinforcing wire 15 or longitudinals 10 to 13, inclusive, and having legs extending for contacting the inner side of the mold of the pipe. Such chairs may be held in position in the molding operations by wiring the chairs to the mold or in any other or designed manner, as indicated at 21 and 22.

The reinforcing for concrete pipe herein described is simple and economical to construct and assemble and attach firmly within the mold in which the pipe is to be formed. The use of such reinforcement had been found to result in the construction of a reinforced concrete pipe having desirable load sustaining characteristics and without the existence therein of points of weakness.

While the particular form of reinforced pipe and reinforcement therefor herein described is well adapted to carry out the objects of the present invention, it is to be understood that various modifications and changes may be made and the invention includes all such modifications and changes as come within the scope of the appended claims.

I claim:

1. A reinforcement for concrete pipe, comprising a coil of wire to be held in elliptical shape within a pipe to be molded, four longitudinal rods positioned at the four points where such elliptical reinforcement will most nearly approach the surface of the pipe to be formed, said rods being attached to the turns of said coil, auxiliary reinforcements crossing said rods and extending in the direction of the greater concrete thickness of the pipe to be formed, and short and long chairs attached to the rods in such manner as to be adapted to mount the same in elliptical form within a pipe mold.

2. A reinforcement for concrete pipe, comprising a coil of wire to be held in elliptical shape within a pipe to be molded, four longitudinal rods positioned at the four points where such elliptical reinforcement will most nearly approach the surface of the pipe to be formed, said rods being attached to the turns of said coil, auxiliary reinforcements crossing said rods for strengthening the pipe to be formed at said longitudinals, and short and long chairs attached to the rods in such manner as to be adapted to mount the same in elliptical form within a molding member.

3. A reinforcement for concrete pipe adapted to be used in a mold, comprising a cylindrical molding member, a coil of wire coiled in elliptical shape within said molding member, four longitudinal rods positioned at the points where such elliptical coil most nearly approaches the surface of the pipe to be formed, said rods being attached to the turns of said coil, auxiliary reinforcements crossing said rods for strengthening the pipe to be produced at said longitudinals, and short and long chairs attached to said rods and to said molding member whereby to attach the reinforcement to the molding member and to hold the same during centrifugal molding operations.

4. A reinforcement for concrete pipe adapted to be used in a mold, comprising a coil of wire mounted in elliptical position within the molding member, a longitudinal rod positioned at each of the points where the elliptical coil most nearly approaches the molding member, a chair resting against the molding member and attached to the reinforcement and to said molding member, a longitudinal rod at each of the points where the elliptical coil is at the greatest distance from the molding member, and chairs resting against the molding member and attached to the reinforcement and to said molding member whereby the reinforcement is supported solely by said centrifugal molding member.

5. A reinforcement for concrete pipe adapted to be used in a mold, comprising a coil of wire mounted in elliptical position within the molding member, a longitudinal rod positioned at each of the points where the elliptical coil most nearly approaches the molding member, a chair resting against the molding member and attached to the reinforcement and to said molding member, a longitudinal rod at each of the points where the elliptical coil is at the greatest distance from the molding member, chairs resting against the molding member and attached to the reinforcement and to said molding member whereby the reinforcement is supported solely by said centrifugal molding member, and auxiliary reinforcements crossing the longitudinal rods so as to strengthen the produced pipe at its weakest points.

JOSEPH G. PROSSER.